(12) United States Patent
Pruszenski

(10) Patent No.: US 7,568,382 B2
(45) Date of Patent: Aug. 4, 2009

(54) TECHNIQUES FOR MEASURING ENGINE HORSEPOWER USING A LINEAR TRANSDUCER

(75) Inventor: Anthony Stanley Pruszenski, Georgetown, MA (US)

(73) Assignee: Lycoming Engines, a division of Avco Corporation, Williamsport, PA (US)

( * ) Notice: Subject to any disclaimer, the term of this patent is extended or adjusted under 35 U.S.C. 154(b) by 91 days.

(21) Appl. No.: 11/809,329

(22) Filed: May 31, 2007

(65) Prior Publication Data

US 2008/0295587 A1 Dec. 4, 2008

(51) Int. Cl.
*G01M 15/00* (2006.01)

(52) U.S. Cl. .................................... 73/114.15

(58) Field of Classification Search ............ 73/114.13, 73/114.14, 114.15, 116.01, 116.02, 118.02, 73/118.03
See application file for complete search history.

(56) References Cited

U.S. PATENT DOCUMENTS

| | | | |
|---|---|---|---|
| 2,362,308 A | | 11/1944 | William |
| 2,941,398 A | * | 6/1960 | Pugnaire et al. .......... 73/112.04 |
| 3,710,617 A | * | 1/1973 | Andersen ................. 73/116.03 |
| 3,742,758 A | | 7/1973 | Pohl |
| 3,800,599 A | | 4/1974 | Goran |
| 3,903,738 A | | 9/1975 | Malchow |
| 4,174,627 A | * | 11/1979 | Swis et al. ............... 73/116.02 |
| 4,176,547 A | | 12/1979 | McClure et al. |
| 4,603,582 A | | 8/1986 | Middleton |
| 4,788,855 A | * | 12/1988 | Laskody .................. 73/112.04 |
| 5,396,791 A | * | 3/1995 | Mollmann et al. ....... 73/116.03 |
| 5,801,644 A | | 9/1998 | Ruthroff |
| 5,870,687 A | | 2/1999 | Majstorovic |
| 6,182,516 B1 | | 2/2001 | Kowalczyk |
| 7,379,801 B2 | | 5/2008 | Heffington |
| 2001/0029779 A1 | * | 10/2001 | Malbrouck et al. ............ 73/116 |
| 2005/0044933 A1 | * | 3/2005 | Laws ......................... 73/117.3 |
| 2008/0190183 A1 | * | 8/2008 | Erlach et al. ............. 73/114.01 |

FOREIGN PATENT DOCUMENTS

| | | |
|---|---|---|
| DE | 1109917 | 6/1961 |
| FR | 2890737 A1 | 3/2007 |
| GB | 741850 | 12/1955 |
| GB | 1314552 | 4/1973 |

OTHER PUBLICATIONS

International Search Report and Written Opinion from PCT/US2008/058200, mailed Jul. 4, 2008.

* cited by examiner

*Primary Examiner*—Eric S McCall
(74) *Attorney, Agent, or Firm*—BainwoodHuang

(57) ABSTRACT

An engine test system includes a base constructed and arranged to reside at a fixed location. The system further includes an engine support member constructed and arranged to concurrently support an engine and move relative to the base. The system further includes a linear transducer having (i) a first portion supported by the base, (ii) a second portion supported by the engine support member, and (iii) a circuit adjacent the first and second portions. The circuit is constructed and arranged to provide a linear transducer signal identifying an amount of linear compression and/or tension between the engine support member and the base along a predefined direction. When the linear transducer resides at a break in station, such an embodiment provides a simple, low cost mechanism which is capable of providing a horsepower measurement for every engine passing through the break in station.

19 Claims, 5 Drawing Sheets

TECHNIQUES FOR MEASURING ENGINE HORSEPOWER USING A LINEAR TRANSDUCER

BACKGROUND

Engine manufacturers typically run their engines through a "break in" phase to provide initial lubrication and wear to various parts of the engine. For example, in the context of a propeller engine for an aircraft, an engine break in station typically resides at the end of the manufacturing line. At the break in station, the manufacturer typically fastens a newly built engine to a stationary footing or foundation, installs a load (e.g., a propeller) onto the engine's drive shaft, and connects fluid and electrical lines to the appropriate engine locations. The manufacturer then runs the engine for a period of time (e.g., one or two hours) at various speeds (i.e., different RPMs). During this time, the manufacturer typically monitors various operating parameters of the engine such as oil temperature and pressure to confirm that the engine is operating properly.

Some engine manufacturers occasionally pull engines from the end of their manufacturing lines and put these engines through extra tests. For example, in the above-described context of a propeller engine for an aircraft, a manufacturer may measure engine horsepower from a sample of engines after the break in phase in order to obtain confidence that all engines coming off the manufacturing line are capable of providing a certain specified horsepower. To this end, the engine manufacture typically removes a sample engine (e.g., one out every ten engines) from the break in station and transports that engine to a dynamometer station. The manufacturer then connects the sample engine to a dynamometer.

In one conventional dynamometer setting, the engine manufacturer connects the drive shaft of the sampled engine to an electric generator which operates as the load. The manufacturer then runs the engine at various speeds and obtains an electric output signal from the electric generator. The manufacturer converts that signal into horsepower measurements. In other conventional settings, a load other than an electrical generator is suitable as a load/power absorber (e.g., a water brake, a compressor, a fan brake and a pony brake).

SUMMARY

Unfortunately, there are deficiencies to the above-described conventional approaches to measuring engine horsepower. For example, in the above-described conventional engine sampling approach which involves the use of an electric generator, it is burdensome and time consuming to occasionally transfer engines from the break in station to the dynamometer station, and then to connect the drive shafts of these sampled engines to the electric generator to obtain horsepower measurements. In some situations, this additional endeavor may take several hours (e.g., four hours) to carry out.

Additionally, the above-described conventional engine sampling approach does not provide a measurement for each engine coming off the manufacturing line. Rather, one must infer that non-sampled engines provide the same power as the sampled engines even though the engines may be vulnerable to various (e.g., tolerance stack up, imprecisions, differences in supplied components, and so on). Nevertheless, even though it may be desirable to conduct a horsepower measurement on each engine coming off the manufacturing line, the task of passing each engine through the dynamometer station may be impractical.

In contrast to the above-described conventional engine sampling approach, an improved technique for measuring engine horsepower utilizes a linear transducer to provide a signal identifying an amount of linear compression or tension (e.g., resulting torque) from an engine during operation. This amount of linear compression or tension is capable of being consistently and reliably converted to a horsepower measurement. Moreover, the linear transducer is capable of residing at an engine break in station thus alleviating the need to transport sample engines to a dedicated dynamometer station. That is, horsepower is capable of being conveniently measured from each engine during the engine break in phase in a minimal amount of time.

One embodiment is directed to an engine test system which includes a base constructed and arranged to reside at a fixed location. The system further includes an engine support member constructed and arranged to concurrently support an engine and move relative to the base. The system further includes a linear transducer having (i) a first portion supported by the base, (ii) a second portion supported by the engine support member, and (iii) a circuit adjacent the first and second portions. The circuit is constructed and arranged to provide a linear transducer signal identifying an amount of loading (e.g., linear compression or tension) between the engine support member and the base along a predefined direction. When the linear transducer resides at a break in station, such an embodiment provides a simple, low cost mechanism which is capable of providing a horsepower measurement for every engine passing through the break in station.

BRIEF DESCRIPTION OF THE DRAWINGS

The foregoing and other objects, features and advantages will be apparent from the following description of particular embodiments of the invention, as illustrated in the accompanying drawings in which like reference characters refer to the same parts throughout the different views. The drawings are not necessarily to scale, emphasis instead being placed upon illustrating the principles of various embodiments of the invention.

DETAILED DESCRIPTION

An improved technique for measuring engine horsepower utilizes a linear transducer to provide a signal identifying an amount of linear compression or tension provided an engine in a particular direction during operation. Such linear compression or tension results from the engine driving a load (e.g., an adjustable pitch propeller). The amount of linear compression or tension is capable of being consistently and reliably converted to a horsepower measurement thus enabling a user to measure engine horsepower. Moreover, the linear transducer is capable of residing at an engine break in (or burn in) station thus alleviating the need to transport sample engines to a dedicated dynamometer station. That is, horsepower is capable of being conveniently measured from each engine during the engine break in phase while the engine is being broken in.

Figure 1:
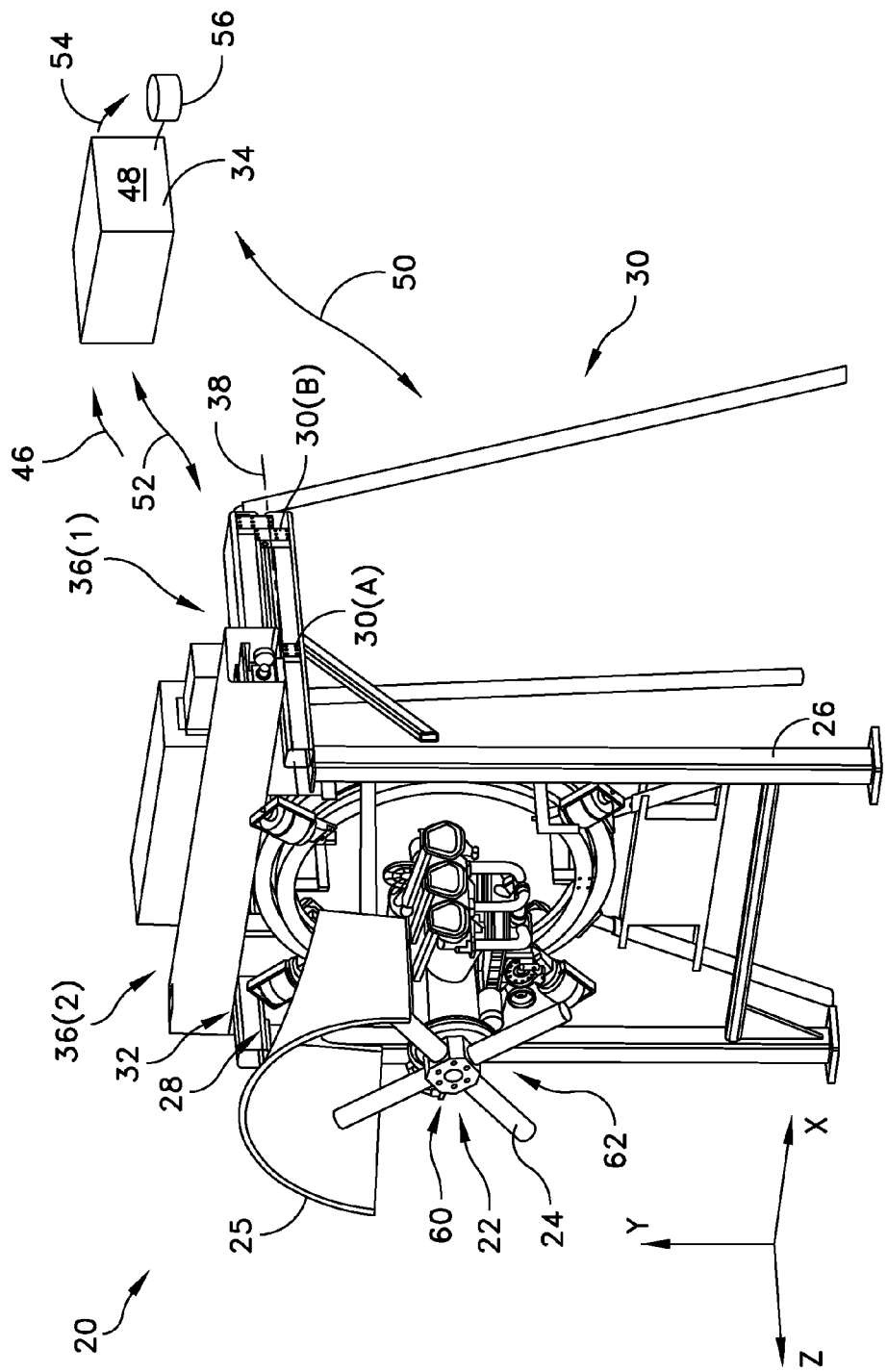
FIG. 1 is a perspective view of an engine test system which utilizes a linear transducer for measuring engine horsepower.
Figure 2:
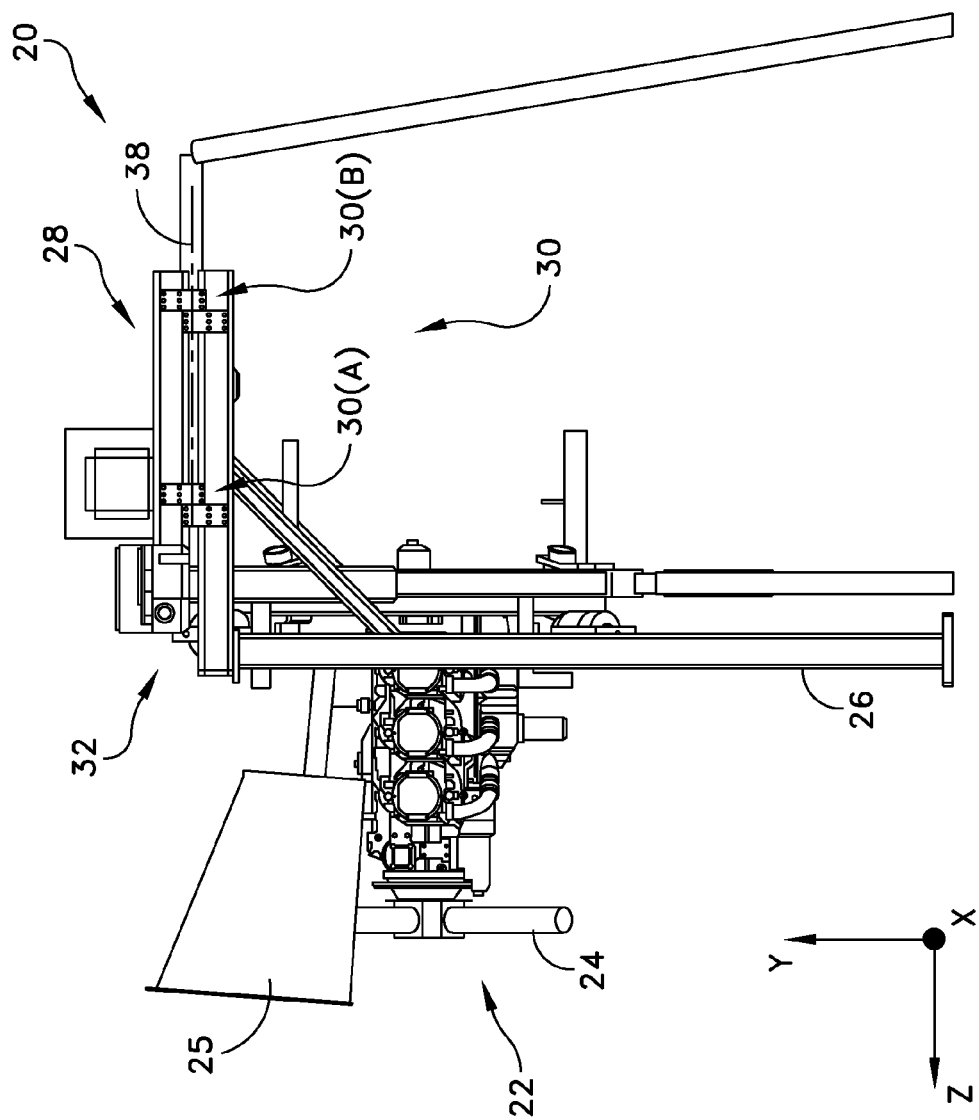
FIG. 2 is a side view of a portion of the engine test system of FIG. 1.
Figure 3:
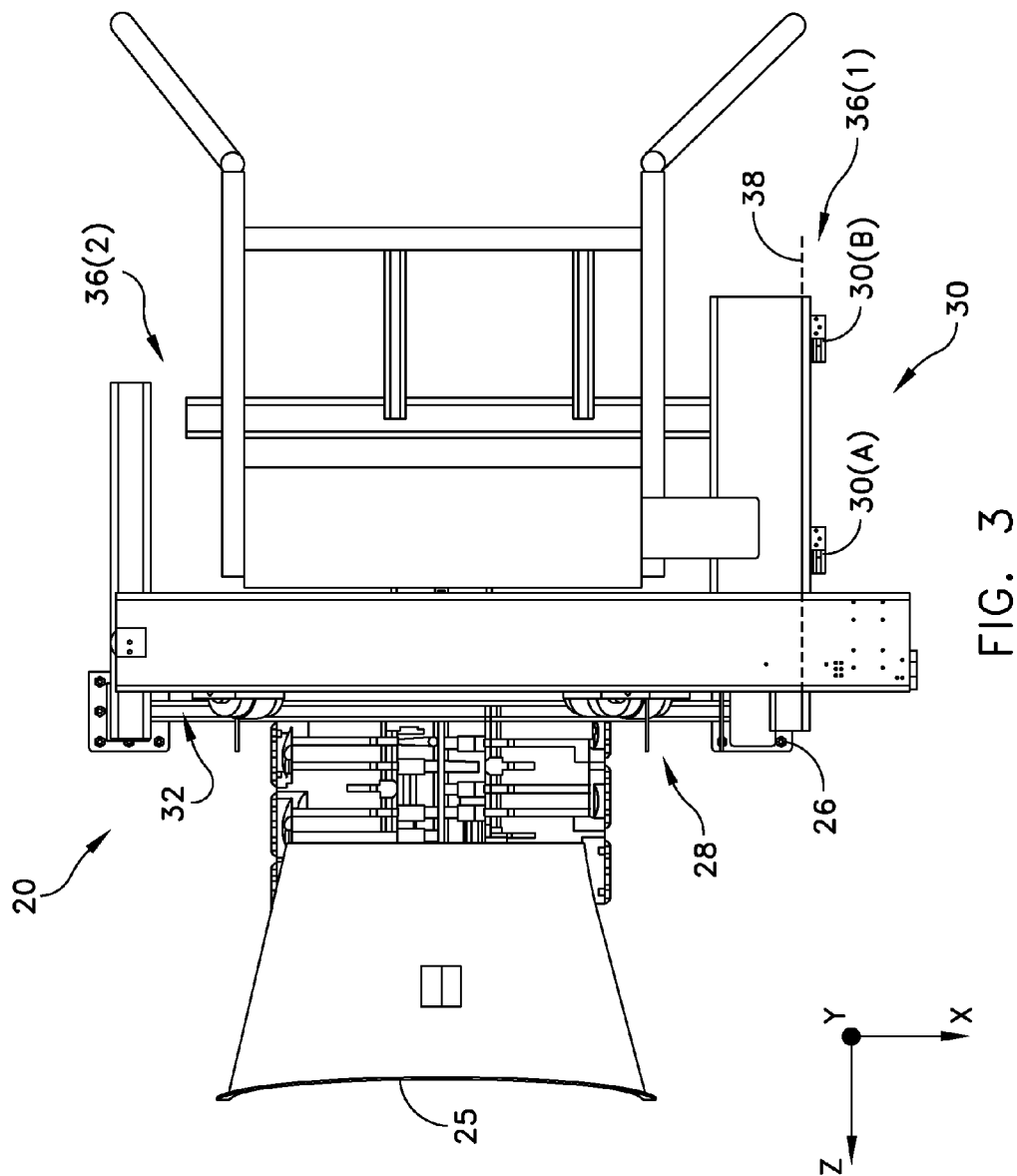
FIG. 3 is a top view of a portion of the engine test system of FIG. 1.
Figure 4:
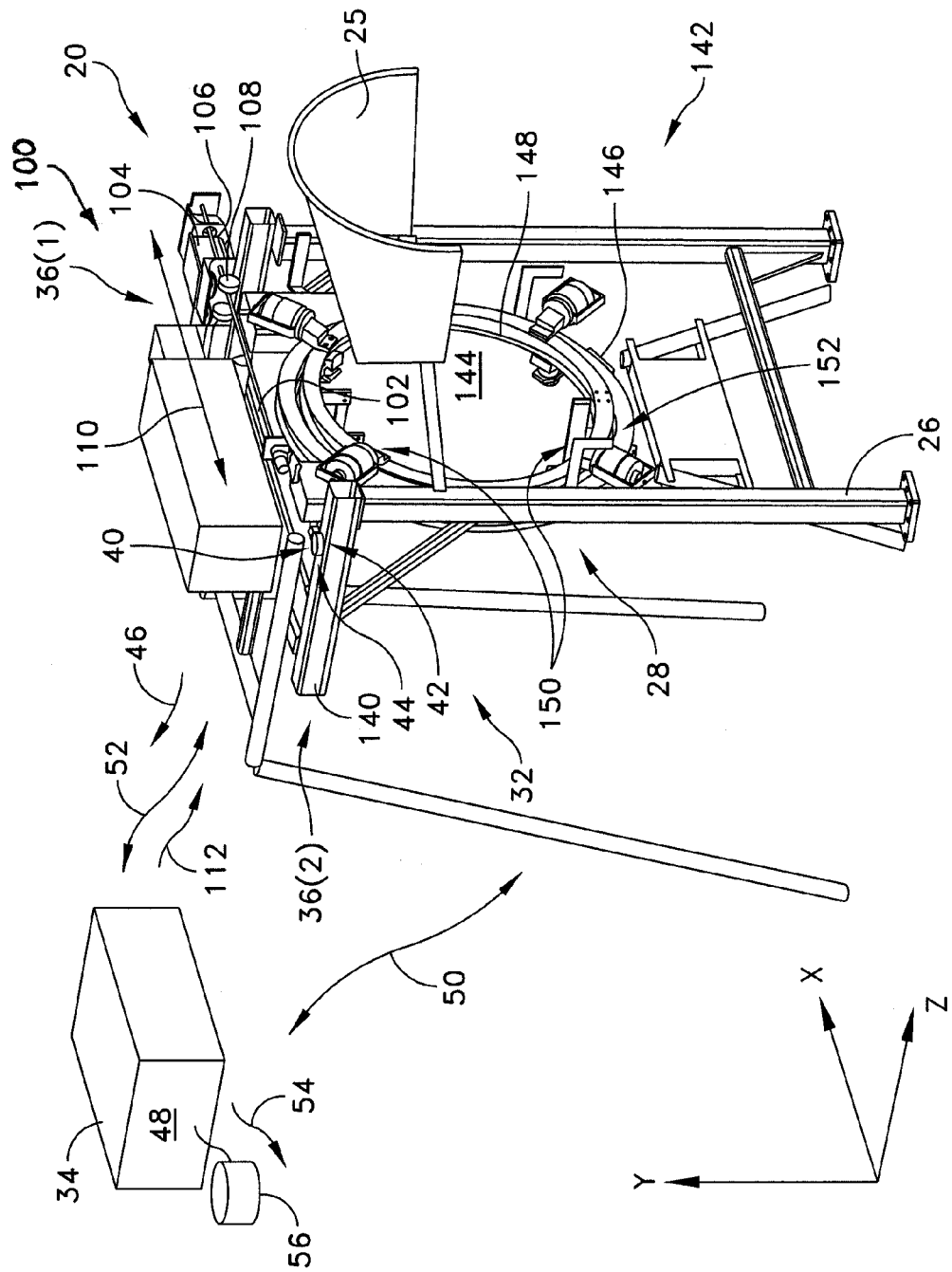
FIG. 4 is a reverse angle view showing particular additional details of the engine test system of FIG. 1.

FIGS. 1-4 show an engine test system 20 which is constructed and arranged to break in and test an engine 22 having a propeller 24 as well as concurrently measure horsepower of the propeller engine 22. FIG. 1 is a perspective view of the engine test system 20. FIG. 2 is a side view of the engine test system 20. FIG. 3 is a top view of the engine test system 20. FIG. 4 is a reverse view showing particular additional details of the engine test system 20. The propeller 24 is illustrated with cylindrical portions radiating from its center to show that the propeller 24 can be a variable pitch propeller or similar mechanism to adjust for maximum loading. A shroud 25 is optionally available to deflect air over the engine 22 to provide cooling to the engine cylinders.

The engine test system 20 includes, among other things, a stationary base 26, a movable engine support member (or movable support) 28, a set of hinges 30(A), 30(B) (collectively, hinges 30), a linear transducer 32 (illustrated by the arrow 32 in FIGS. 1-3, but shown in more detail in FIG. 4) and an electronic control circuit 34 (illustrated in FIGS. 1 and 4 only). The stationary base 26 is arranged to reside at a fixed location (e.g., sit on a floor, suspend from a ceiling or wall, etc.). By way of example, the base 26 is shown as having a floor mounting configuration in FIGS. 1-3. However, a ceiling-mount or wall suspension configuration is capable of providing improved access to certain sides of the engine 22 and the engine test system 20 if desired.

As shown in FIGS. 1-4, the movable engine support member 28 is arranged to support the engine 22 and to move relative to the stationary base 26 in response to operation of the engine 22. The hinges 30 mechanically couple the engine support member 28 to the base 26 in a pivoting manner at a first side 36(1). The linear transducer 32 mechanically couples the engine support member 28 to the base 26 at a second side 36(2) which is horizontally opposed to the first side 36(1). The hinges 30 are arranged to restrict motion of the engine support member 28 to substantially hinged movement relative to the base 26 thus enabling the linear transducer 32 to measure linear loading (e.g., compression or tension along the Y-axis). More precisely, the hinges 30 operate as flexure bearings which provide the engine support member 28 with rotation about a pivot axis 38 which extends in the Z-direction.

It should be understood that an off-the-shelf low hysteresis, frictionless bearing is suitable for use as a hinge 30. Preferably, such a frictionless bearing is arranged to accommodate high loading capacity in combination with high radial and axial stiffness attributes. Examples of bearings which are suitable for use as the hinges 30 are the bearing series provided by C-Flex Bearing Co., Inc. of Frankfort, N.Y. Other off-the-shelf bearings are suitable for use as well.

FIG. 4 shows the engine test system 20, with a top cover removed to reveal the linear transducer 32 and a protected weight mechanism of the system 20. As best seen in FIG. 4, the linear transducer 32 includes a mounting portion 40 which mounts to the stationary base 26, a loading portion 42 which secures to the movable engine support member 28, and an electrical circuit 44 which is adjacent to the mounting portion 40 and the loading portion 42. The electrical circuit 44 (i.e., a mechanical/electrical transducer circuit) is arranged to provide a linear transducer signal 46 which identifies an amount of linear compression and/or tension between the movable engine support member 28 and the stationary base 26 along a predefined axis (e.g., along the Y-axis in FIGS. 1-4).

It should be understood that a load cell or a strain gage is suitable for use as the linear transducer 32. In some arrangements, operation of the engine 22 moves the movable engine support member 28 in the positive Y-direction to compress the linear transducer 32 against the stationary base 26 (see FIGS. 1-4). In other arrangements, the movable engine support member 28 and the stationary base 26 are arranged so that operation of the engine 22 applies compression in the negative Y-direction, or alternatively tension on the linear transducer 32.

In some arrangements, the linear transducer 32 is a load cell which is arranged to measure axial load while minimizing or restricting torque and side loading. Preferably, such a load cell is rated for up to several thousand pounds of force and provides accuracy within 0.1%. An example of a load cell which is suitable for use as the linear transducer 32 is the Model 75 Precision Low Profile Load Cell (rated for 52 to 200,000 lbs. and offers accuracy within 0.10%) which is provided by Honeywell International Inc. of Morristown, N.J. Other off-the-shelf load cells are suitable for use as well.

As shown in FIGS. 1 and 4, the electronic control circuit 34 includes computer-based circuitry 48 which electrically connects to the engine 22 through a set of cables 50 (illustrated generally by the arrow 50 in FIGS. 1 and 4 for simplicity). The set of cables 50 interconnects the electronic control circuit 34 to spark plugs and electronic fuel injectors on the engine 22, as well as to a variety of sensors for robust and reliable closed loop engine operation.

The computer-based circuitry 48 of the electronic control circuit 34 further electrically connects to the engine test system 20 through another set of cables 52 (illustrated generally by the arrow 52 in FIGS. 1 and 4 for simplicity). The set of cables 52 interconnects the electronic control circuit 34 to the linear transducer 32, as well as to a variety of adjustment mechanisms that will be discussed in further detail later.

During the break in and testing phase of the engine manufacturing process, the manufacturer installs the engine 22 onto the engine test system 20 with all electrical cables and fluid hoses in place for normal engine operation. The manufacturer then directs the electronic control circuit 34 to step through a series of individual tests as part of the normal manufacturing process for each engine 22.

During each test, the electronic control circuit 34 runs the engine 22 under test at particular RPMs for particular amounts of time and accumulates, in a database 54, operating data on that engine. In particular, while the electronic control circuit 34 runs the engine 22, monitoring circuitry within the electronic control circuit 34 monitors and records various operating parameters of the engine 22 such as oil temperature and pressure, operating speed, emissions, etc. to confirm that the engine 22 is operating properly. Additionally, the monitoring circuitry measures the amount of load placed on the linear transducer 32. In some arrangements, the electronic control circuit 34 advantageously and dynamically adjusts the pitch of the propeller 24 to provide maximum loading on the engine 22 and thus enable the electronic control circuit 34 to generate a maximum horsepower measurement for the engine 22.

Based on the measured amount of load and the current rate of the engine 22, the electronic control circuit 34 generates a signal 54 indicating the amount of horsepower currently provided by the engine 22. Specifically, the electronic control circuit 34 carries out Equation (1) to determine horsepower:

$$\text{power output of the engine in horsepower} = \frac{2\pi n T}{33,000} \quad (1)$$

where n=rpm of the output shaft 60 (FIG. 1) of the engine 22 and T is the measured torque in ft.-lbs. This signal 54, which includes a maximum horsepower measurement when the propeller 24 is arranged to provide maximum loading, is then stored in an electronic database 56 along with other data regarding the engine 22 (e.g., engine serial number, date, operating parameters, additional sensor readings, etc.). Accordingly, the manufacturer is capable of acquiring and storing horsepower measurements (e.g., dynamometer test data) provided by each engine 22 in the database 56 as that engine 22 passes through the break in phase of the manufacturing process. There is no need to sample engines 22 at a separate dedicated dynamometer station as carried out in conventional approaches to obtaining horsepower measurements.

It should be understood that, during this break in and testing phase, the output shaft 60 of the engine 22 turns the propeller 24 in a particular rotational direction at a particular RPM (e.g., the counterclockwise direction as viewed when facing the engine 22 in FIG. 1). The reverse direction (e.g., clockwise rotation) is also possible with some engine models. As the propeller 24 rotates, the response torque drives the engine 22 in the opposite direction (e.g., the clockwise direction in FIG. 1) thus urging the movable engine support member 28 in a particular direction with a certain amount of force resulting in loading the linear transducer 32 (e.g., compressing the linear transducer 32 in the positive Y-direction as seen in FIGS. 1-4). Accordingly, the transducer signal 46 from the linear transducer 32 provides an indication of the amount of loading provided by the engine 22 when the propeller 24 rotates at the particular RPM. Torque is determined by the distance between the linear transducer 32 (i.e., where the transducer 32 is mounted) to the line of rotation 38 of the flexure bearings 30(A) and 30(B).

In some arrangements, the liner transducer 32 is pre-calibrated to provide a linear response such as a voltage between 0 and 10 Volts depending on the amount of load. For example, the linear transducer 32 is capable of providing 0.0 Volts when the engine 22 is not running, and 10.0 Volts at maximum load.

At this point, it should be understood that the engine test system 20 is capable of compensating for variations in the test environment. For example, there may be multiple engine testing sites, each of which having a slightly different air density (e.g., due to altitude and/or humidity). As another example, the various components of the system 20 may wear out, fatigue, and/or diminish in performance over time (e.g., the hinges 30 may develop hysteresis and degrade after a lengthy period of use).

To provide maximum loading on the engine 22, the propeller 62 preferably includes a pitch adjustment mechanism 62 (illustrated generally by the arrow 62 in FIG. 1) which enables the pitch of the propeller blades 24 to conveniently change and thus orient to a maximum loading pitch regardless of the environmental conditions. In some arrangements, the engine 22 includes a mechanism that adjusts the propeller pitch, e.g., by varying an oil pressure to the propeller 24, by varying an electrical signal to the propeller 62, etc. In other arrangements, the engine 22 is not equipped to adjust the propeller pitch and, in these arrangements, the pitch adjustment is carried out by other means, e.g., by a technician making a manual adjustment, by installation of an adapter which interconnects the propeller 62 to the output shaft 60 and which makes the adjustment dynamically, by installing one of several fixed pitched propellers 62 depending on the environment, and so on.

To confirm proper operation of the system 20 over time and as best viewed in FIG. 4, the engine test system 20 further includes a weight assembly 100 which provides the manufacturer with a way of confirming that the system 20 is properly calibrated. In FIG. 4, a cover which protects operation of the weight assembly 100 has been removed enabling particular components of the weight assembly 100 to be viewed.

The weight assembly 100 includes an elongated member 102 (e.g., a rail or bar), a weight 104, an actuator 106, and an encoder 108. The elongated member 102 substantially extends horizontally along the X-axis between the first sides 36(1) and the second sides 36(2) of the stationary base 26 and the movable engine support member 28. The weight 104 (e.g., a weighted, sliding carrier) is capable of translating to various positions along a range 110 of the elongated member 102 to change loading on the movable engine support member 28. The actuator 106 responds to a control signal 112 from the electronic control circuit 34 to position the weight 104 along the elongated member 102, and the encoder 108 provides position feedback to the electronic control circuit 34.

To confirm that the linear actuator 32 of the system 20 is accurately measuring load, the electronic control circuit 34 moves the weight 104 from its original position to a particular location along the elongated member 102 that provides a particular load while the engine 22 is not running. For example, in one arrangement, the electronic control circuit 34 moves the weight 104 two feet from the side 36(1) toward to the side 36(2) to where the manufacturer has previously confirmed that the loading on the linear transducer is 200 ft.-lbs in the negative Y-direction. The electronic control circuit 34 measures the linear transducer signal 46 to confirm that the linear transducer signal 46 indicates that the loading currently is 200 ft.-lbs on the linear transducer 32 in the negative Y-direction. If the linear transducer signal 46 indicates that the loading is 200 ft.-lbs, the measurements provided by the system 20 are reliable. However, if the linear transducer signal 46 does not indicate that the loading is 200 ft.-lbs, the measurements provided by the system 20 may be unreliable and the system 20 needs to be re-calibrated.

Additionally, to confirm that the system 20 is below a minimum hysteresis threshold, the electronic control circuit 34 moves the weight 104 back to its original position while the engine 22 is not running. For example, in one arrangement, the electronic control circuit 34 moves the weight 104 two feet from the side 36(2) back toward to the side 36(1) where the manufacturer normally positions the weight 104 during engine testing. Once the weight 104 has been moved back to this initial position, the electronic control circuit 34 measures the linear transducer signal 46 to confirm that the linear transducer signal 46 indicates that the loading currently is 0.0 ft.-lbs on the linear transducer 32 in the negative Y-direction within a predefined threshold (e.g., +/−1%, +/−0.10%, etc.). If the linear transducer signal 46 indicates that the loading is within this threshold range, the manufacturer knows that the system 20 continues to operate with acceptable and minimal hysteresis. However, if the linear transducer signal 46 does not indicate that the loading is within this range, the measurements provided by the system 20 may be unreliable and needs to be checked. In particular, the engine installation may need adjustment. Alternatively, the system 20 may need maintenance (e.g., the system 20 may need new hinges 30 and/or a new linear transducer 32, etc.), and so on.

Figure 5:
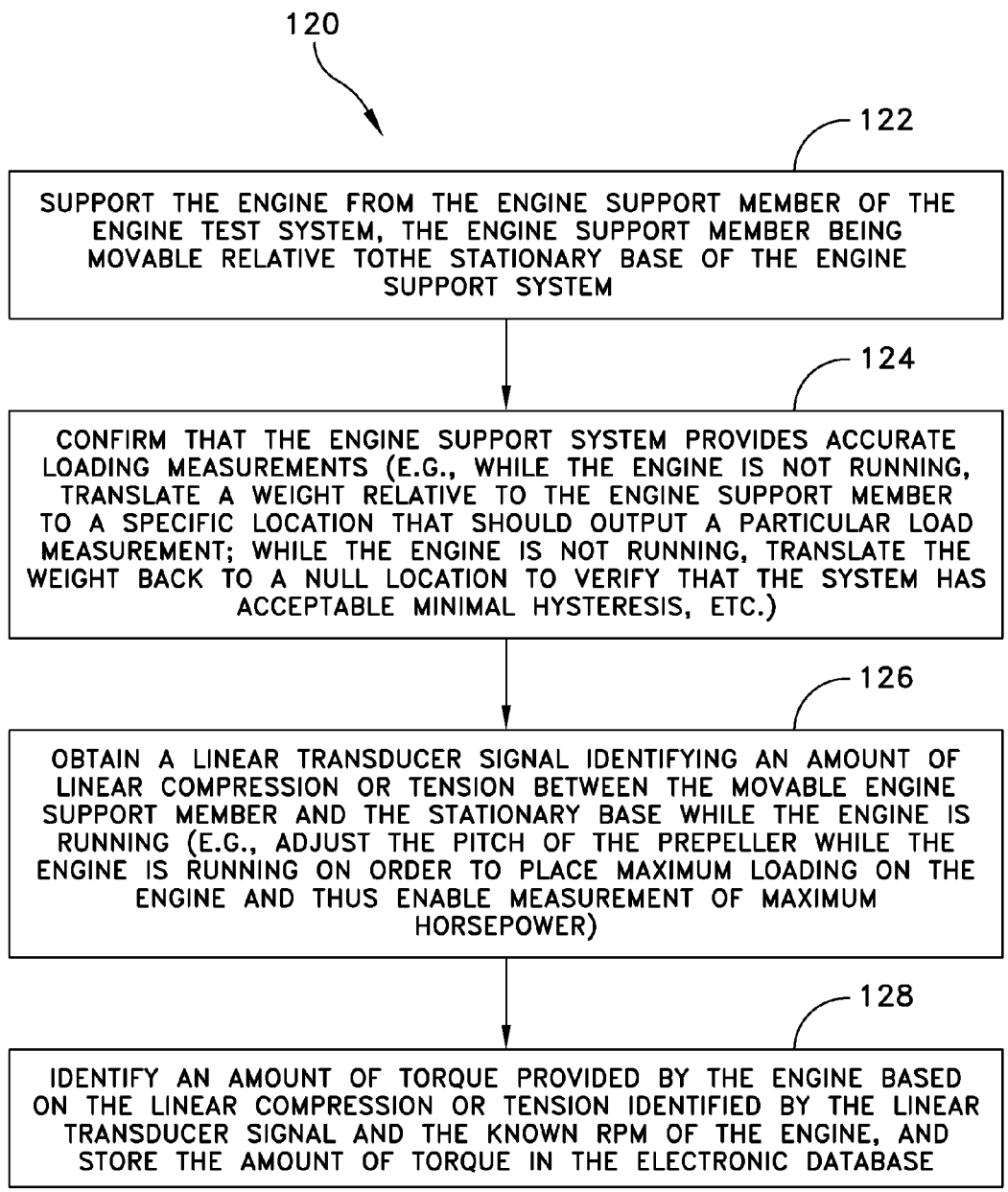
FIG. 5 is a flowchart of a procedure which is performed by the engine test system of FIG. 1.

FIG. 5 is a flowchart illustrating various steps of a procedure 120 which is carried out by the engine manufacturer when using the engine test system 20. In step 122, the manufacturer supports an engine 22 from the engine support member 28 which is capable of moving relative to the stationary base 26.

In step 124, the manufacturer confirms that the system 20 remains properly calibrated and in operational order while the engine 22 is not running. For example, the manufacturer translates the weight 104 along the elongated member 102 to confirm that the signal 46 from the linear transducer 32 provides an accurate loading measurement. As another example, the manufacturer translates the weight 104 back to its null position to confirm that there is little or no hysteresis (i.e., acceptable hysteresis). Otherwise, the system 20 needs re-calibration, part servicing, and/or engine installation adjustment.

In step 126, the manufacturer obtains the linear transducer signal 46 from the linear transducer 32 while the engine 22 is running. The linear transducer signal 46 identifies an amount of linear compression or tension between the engine support member 28 and the base 26. Here, the electronic control circuit 34 concurrently breaks in the engine 22 as well as measures current engine torque.

In step 128, the manufacturer identifies an amount of horsepower provided by the engine 22 in response to the linear transducer signal 46. The measured amount is preferably generated by computer operations (see Equation (1) above) and then stored in the database 56 along with other test information thus enabling the manufacturer to have a record of the particular engine's performance while it was undergoing break in. In some arrangements, the electronic control circuit 34 is capable of adjusting the pitch of the propeller 24 until it provides maximum loading on the engine 22 to identify maximum horsepower provided by the engine 22.

As described above, an improved technique for measuring engine horsepower utilizes a linear transducer 32 to provide a signal 46 identifying an amount of linear compression or tension provided an engine 22 in a particular direction during operation. Such linear compression or tension results from the engine driving a load (e.g., an adjustable pitch propeller 24). The amount of linear compression or tension is capable of being consistently and reliably converted to a horsepower measurement thus enabling a user to measure engine horsepower. Moreover, the linear transducer 32 is capable of residing at an engine break in (or burn in) station thus alleviating the need to transport sample engines to a dedicated dynamometer station. That is, horsepower is capable of being conveniently measured from each engine 22 during the engine break in phase while the engine 22 is being broken in.

While various embodiments of the invention have been particularly shown and described, it will be understood by those skilled in the art that various changes in form and details may be made therein without departing from the spirit and scope of the invention as defined by the appended claims.

For example, in some arrangements and as shown in FIG. 4, the movable engine support member 28 is capable of including a support frame 140 which is arranged to be hung from the stationary base 26, and a ring assembly 142 which is supported by the support frame 140 and which holds the engine 22 (also see FIGS. 1-3) in place within a central space 144 defined by the ring assembly 142. In such an arrangement, the ring assembly 142 preferably includes a first ring member 146, a second ring member 148 which is substantially concentric with the first ring member 146, and a set of vibration dampening members 150. The first ring member 146 is supported by the support frame 140. The second ring member 148 supports the engine 22 (FIGS. 1-3). The vibration dampening members 150 interconnect the first ring member 146 with the second ring member 148 and are distributed around a periphery 152 of the second ring member 148 to dampen vibration of the engine 22 while the engine 22 runs. The use of such a movable engine support member 28 provides minimal distortion and interference on the linear transducer signal 46 during engine torque measurement.

Additionally, it should be understood that the particular geometries and orientations of the system 20 were provided by way of example. It is possible to connect an engine 22 to a movable frame (see the movable engine support member 28 and the base 26 above) by other means and still measure horsepower. In fact, there is no restriction on the orientation of the movable frame, whether it is arranged horizontally, vertically, or in a different direction. In any of these situations, the flexure hinge line 38 resides parallel to the engine shaft 60 (e.g., see FIG. 1), and the linear transducer 32 is offset from the flexure hinge line 38 to allow torque measurement. Such modifications and enhancements are intended to belong to various embodiments of the invention.

What is claimed is:

1. An engine test system, comprising:
    a base constructed and arranged to reside at a fixed location;
    an engine support member constructed and arranged to concurrently support an engine and move relative to the base;
    a linear transducer having (i) a first portion supported by the base, (ii) a second portion supported by the engine support member, and (iii) a circuit adjacent the first and second portions, the circuit being constructed and arranged to provide a linear transducer signal identifying an amount of linear loading between the engine support member and the base along a predefined direction; and
    a set of hinges which is constructed and arranged to restrict the engine support member to substantially hinged movement relative to the base;
    wherein each of the base and the engine support member has a first side and a second side which is opposite that first side;
    wherein the set of hinges mechanically couples the first side of the engine support member to the first side of the base;
    wherein the linear transducer mechanically couples the second side of the engine support member to the second side of the base;
    wherein the first sides of the base and the engine support member are horizontally opposite the second sides of the base and the engine support member; and
    wherein the linear transducer includes a load cell which outputs, as the linear transducer signal identifying the amount of linear loading along the predefined direction, a load cell signal indicating a measure of load in a vertical direction.

2. An engine test system as in claim 1 wherein the load cell of the linear transducer is constructed and arranged to measure displacement in a direction which is substantially non-parallel to an axis of rotation of the engine when the engine is supported by the engine support member.

3. An engine test system as in claim 1 wherein the set of hinges includes:
    multiple flexure bearings which are distributed along the first sides of the base and the engine support member.

4. An engine test system as in claim 3 wherein the load cell and two flexure bearings completely suspend the engine support member from the base.

5. An engine test system as in claim 4 wherein the fixed location is above a floor; and
    wherein the base is constructed and arranged to hang the engine support member and the engine above the floor during operation.

6. An engine test system as in claim 5 wherein the engine support member includes:
   a support frame which is constructed and arranged to be hung from the base, and
   a ring assembly which is constructed and arranged to be supported by the support frame and to hold the engine in place within a central space defined by the ring assembly.

7. An engine test system as in claim 6 wherein the ring assembly includes:
   a first ring member which is supported by the support frame;
   second ring member which is constructed and arranged to support the engine, the first ring member being substantially concentric with the second ring member, and
   vibration dampening members which interconnect the first ring member with the second ring member, the vibration dampening members being distributed around a periphery of the second ring member to dampen vibration of the engine during operation.

8. An engine test system as in claim 3, further comprising:
   a controller which is electrically coupled to the engine, the controller being configured to control a rate of operation of the engine.

9. An engine test system as in claim 8, further comprising:
   a database coupled to the controller, the database being constructed and arranged to store dynamometer test data accumulated from the controller.

10. An engine test system as in claim 8 wherein the controller is constructed and arranged to convert the load cell signal into an amount of torque provided by the engine when running at a predetermined rate.

11. An engine test system as in claim 10, further comprising:
    an elongated member which substantially extends along an axis between the first sides and the second sides of the base and the engine support member, and
    a weight which is constructed and arranged to translate along the axis which extends between the first sides and the second sides of the base and the engine support member.

12. An engine test system as in claim 11, further comprising:
    an encoder which is constructed and arranged to identify location of the weight along the axis.

13. An engine test system as in claim 10, further comprising:
    an adjustable pitch propeller constructed and arranged to mount to the engine.

14. An engine test system as in claim 13 wherein the controller is constructed and arranged to dynamically alter a pitch of the adjustable pitch propeller to provide a maximum load on the engine.

15. A method for testing an engine, comprising:
    supporting an engine from an engine support member which moves relative to a base that resides at a fixed location;
    obtaining a linear transducer signal from a linear transducer, the linear transducer signal identifying an amount of linear loading between the engine support member and the base along a predefined direction, the linear transducer having (i) a first portion supported by the base, (ii) a second portion supported by the engine support member, and (iii) a circuit adjacent the first and second portions which is constructed and arranged to provide the linear transducer signal;
    identifying an amount of torque provided by the engine in response to the linear transducer signal; and
    mounting an adjustable pitch propeller to the engine and adjusting a pitch of the adjustable pitch propeller to control an amount of load on the engine during engine operation.

16. A method as in claim 15, further comprising:
    maintaining the engine at a predetermined rate of operation while obtaining the linear transducer signal.

17. A method as in claim 15 wherein obtaining the linear transducer signal from the linear transducer includes:
    measuring a load cell displacement in a direction which is substantially non-parallel to an axis of rotation of the engine when the engine is supported from the engine support member.

18. A method as in claim 15, further comprising:
    translating a weight horizontally from an initial location to a predefined location of the engine support member; and
    reading the linear transducer signal from the linear transducer while the weight resides at the predefined location and while the engine is not running to confirm accuracy of the linear transducer.

19. A method as in claim 18, further comprising:
    translating the weight horizontally from the predefined location back to the initial location of the engine support member; and
    reading the linear transducer signal from the linear transducer while the weight resides at the initial location and while the engine is not running to confirm acceptable hysteresis exists.

* * * * *